United States Patent
Muramatsu et al.

(10) Patent No.: US 10,526,672 B2
(45) Date of Patent: Jan. 7, 2020

(54) ELECTRICAL STEEL SHEET WITH INSULATING COATING

(71) Applicant: JFE STEEL CORPORATION, Chiyoda-ku, Tokyo (JP)

(72) Inventors: Naoki Muramatsu, Tokyo (JP); Nobuko Nakagawa, Tokyo (JP); Kazumichi Sashi, Tokyo (JP); Chiyoko Tada, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 154 days.

(21) Appl. No.: 15/562,994

(22) PCT Filed: Apr. 5, 2016

(86) PCT No.: PCT/JP2016/001916
§ 371 (c)(1),
(2) Date: Sep. 29, 2017

(87) PCT Pub. No.: WO2016/163116
PCT Pub. Date: Oct. 13, 2016

(65) Prior Publication Data
US 2018/0251869 A1    Sep. 6, 2018

(30) Foreign Application Priority Data

Apr. 7, 2015   (JP) .................. 2015-078592

(51) Int. Cl.
| | |
|---|---|
| *C21D 8/12* | (2006.01) |
| *C23C 22/68* | (2006.01) |
| *C09D 5/08* | (2006.01) |
| *H01F 1/18* | (2006.01) |
| *B05D 3/02* | (2006.01) |
| *C09D 7/63* | (2018.01) |
| *C09D 7/40* | (2018.01) |
| *C09D 5/00* | (2006.01) |
| *C08K 3/22* | (2006.01) |
| *C08K 3/36* | (2006.01) |
| *B05D 5/12* | (2006.01) |
| *B05D 7/14* | (2006.01) |

(52) U.S. Cl.
CPC ............ *C21D 8/1283* (2013.01); *C09D 5/00* (2013.01); *C09D 5/084* (2013.01); *C09D 7/63* (2018.01); *C09D 7/70* (2018.01); *C23C 22/68* (2013.01); *H01F 1/18* (2013.01); *B05D 3/0254* (2013.01); *B05D 5/12* (2013.01); *B05D 7/14* (2013.01); *B05D 2202/10* (2013.01); *B05D 2518/12* (2013.01); *C08K 3/36* (2013.01); *C08K 2003/2265* (2013.01); *C23C 2222/20* (2013.01)

(58) Field of Classification Search
CPC .... B05D 3/0254; C21D 8/1283; C09D 5/084; C23C 22/68; H01F 1/18

USPC ......................................................... 148/110
See application file for complete search history.

(56) References Cited

U.S. PATENT DOCUMENTS

| | | | |
|---|---|---|---|
| 3,976,497 A * | 8/1976 | Clark ................... | C09D 183/04 106/287.16 |
| 6,589,324 B2 | 7/2003 | Kamo et al. | |
| 9,455,062 B2 | 9/2016 | Kim et al. | |
| 9,534,136 B2 | 1/2017 | Sashi et al. | |
| 2010/0221549 A1 | 9/2010 | Shigekuni et al. | |
| 2012/0088096 A1 | 4/2012 | Takeda et al. | |
| 2012/0171467 A1 | 7/2012 | Takeda et al. | |
| 2013/0115444 A1 | 5/2013 | Sashi et al. | |
| 2014/0023879 A1 * | 1/2014 | Shibao ..................... | C09D 5/08 428/612 |
| 2016/0111182 A1 | 4/2016 | Sashi et al. | |

FOREIGN PATENT DOCUMENTS

| | | |
|---|---|---|
| CN | 102459696 A | 5/2012 |
| CN | 102575352 A | 7/2012 |
| CN | 103003470 A | 3/2013 |
| CN | 104025207 A | 9/2014 |
| EP | 2800103 A1 | 11/2014 |
| JP | H03232977 A | 10/1991 |
| JP | H04141590 A | 5/1992 |
| JP | H08216332 A | 8/1996 |
| JP | H09122577 A | 5/1997 |
| JP | H1036976 A | 2/1998 |

(Continued)

OTHER PUBLICATIONS

Apr. 19, 2019, Office Action issued by the Korean Intellectual Property Office in the corresponding Korean Patent Application No. 10-2017-7029970 with English language concise statement of relevance.

(Continued)

*Primary Examiner* — Anthony J Zimmer
*Assistant Examiner* — Ricardo D Morales
(74) *Attorney, Agent, or Firm* — Kenja IP Law PC

(57) ABSTRACT

The disclosure provides an electrical steel sheet with an insulating coating excellent in both punchability and powdering resistance, without any chromium compound being contained in the insulating coating. The electrical steel sheet with an insulating coating includes an electrical steel sheet and an insulating coating formed on the electrical steel sheet. The insulating coating contains Si and particulate organic resin. The organic resin contains primary particles having an average primary particle size of 1.0 μm or less, and 5% or more and 50% or less of the primary particles of the organic resin are agglomerated particles.

5 Claims, No Drawings

(56) References Cited

FOREIGN PATENT DOCUMENTS

| | | | |
|---|---|---|---|
| JP | H1046350 A | | 2/1998 |
| JP | H10130858 A | | 5/1998 |
| JP | 2000034578 A | * | 2/2000 |
| JP | 2000034578 A | | 2/2000 |
| JP | 2007168273 A | | 7/2007 |
| JP | 2007197820 A | | 8/2007 |
| JP | 2009155707 A | | 7/2009 |
| JP | 2012025999 A | | 2/2012 |
| JP | 2012028538 A | | 2/2012 |
| JP | 2012028538 A | * | 2/2012 |
| RU | 2534461 C2 | | 11/2014 |
| TW | 1221861 B | | 10/2004 |
| TW | 201206695 A1 | | 2/2012 |
| WO | 2011033943 A1 | | 3/2011 |
| WO | 2014188679 A1 | | 11/2014 |

OTHER PUBLICATIONS

Jan. 3, 2018, Extended European Search Report issued by the European Patent Office in the corresponding European Patent Application No. 16776288.9.

Mohammad Shafiur Rahman et al., "Measurement of glass transition temperature by mechanical (DMTA), thermal (DSC and MDSC), water diffusion and density methods: A comparison study", Chemical Physics Letters, 2007, pp. 372-377, vol. 440, No. 4-6.

Renliang Xu et al., "Comparison of sizing small particles using different technologies", Powder Technology, 2003, pp. 145-153, vol. 132, No. 2-3.

May 17, 2016, International Search Report issued in the International Patent Application No. PCT/JP2016/001916.

May 23, 2017, Notification of Reasons for Refusal issued by the Japan Patent Office in the corresponding Japanese Patent Application No. 2016-535069 with English language Concise Statement of Relevance.

Nov. 29, 2016, Office Action issued by the Taiwan Intellectual Property Office in the corresponding Taiwanese Patent Application No. 105110923 with English language Search Report.

Dec. 10, 2018, Office Action issued by the State Intellectual Property Office in the corresponding Chinese Patent Application No. 201680018838.0 with English language search report.

Oct. 19, 2018, Office Action issued by the Federal Service for Intellectual Property, Patents and Trademarks of the Russian Federation in the corresponding Russian Patent Application No. 2017138325 with English language search report.

* cited by examiner

ELECTRICAL STEEL SHEET WITH INSULATING COATING

TECHNICAL FIELD

This disclosure relates to an electrical steel sheet with an insulating coating.

BACKGROUND

An insulating coating applied to an electrical steel sheet used for motors, transformers and the like is required to have various properties such as not only interlaminar resistance but also convenience during processing and molding, stability during storage and use, and so on. Particularly an insulating coating with excellent punchability can reduce frequency of replacement of press mold during punching. Since electrical steel sheets are used in a variety of applications, it is attempted to develop various insulating coatings depending upon the application. When an electrical steel sheet is subjected to punching, shearing, bending, or the like, magnetic properties are deteriorated due to residual strain, so that stress relief annealing at a temperature of about 700° C. to 800° C. is frequently conducted for solving this problem. In this case, therefore, the insulating coating must be resistant to the stress relief annealing.

Insulation coatings applied to electrical steel sheets are roughly classified into three types:
(1) Inorganic coating placing great importance on weldability and heat resistance, and being resistant to stress relief annealing;
(2) Resin-containing inorganic coating aimed at achieving both punchability and weldability, and achieving resistance to stress relief annealing (i.e., semi-organic coating); and
(3) Organic coating being unable to be subjected to stress relief annealing in a special application.
However, only the coatings containing an inorganic component of types (1) and (2) above are resistant to the stress relief annealing as general-purpose product, and both of them have been used to normally contain a chromium compound. Particularly, the chromium insulating coating of type (2), which is manufactured by one coat one bake, can remarkably improve punchability comparing with inorganic insulating coatings, and therefore is widely used.

However, as environmental awareness is rising in recent years, chromate free products having an insulation coating free of chromium compound are demanded by consumers even in the field of electrical steel sheets. The following are techniques for forming insulating coatings of type (2) by applying a surface coating solution to the surface of an electrical steel sheet, where the surface coating solution contains both an organic component and an inorganic component, and does not contain any chromium compound.

JPH10-130858A (PTL 1) describes an electrical steel sheet with an insulating coating that can be manufactured by low-temperature baking and subjection to stress relief annealing, being excellent in boiling water vapor resistance and solvent resistance. The insulating coating contains a resin that has a glass transition point of 30° C. to 150° C., and alumina-containing silica.

JPH10-46350A (PTL 2) describes a technique for forming an insulating coating using a water solution as surface coating solution, where the insulating coating is excellent in properties such as corrosion resistance before stress relief annealing, and the water solution is prepared by adding an organic substance consisting of one or more water-soluble or emulsion type resins to an inorganic colloidal substance consisting of one or more of colloidal silica, alumina sol, and zirconia sol.

JP2007-197820A (PTL 3) describes an electrical steel sheet excellent in corrosion resistance, adhesion property, solvent resistance, and anti-sticking property, comprising an insulating coating consisting of a polysiloxane polymer obtained by copolymerizing polysiloxane and various organic resins, and inorganic compounds such as silica and silicate.

CITATION LIST

Patent Literature

PTL 1: JPH10-130858A
PTL 2: JPH10-46350A
PTL 3: JP2007-197820A

SUMMARY

Technical Problem

However, the techniques described in PTLS 1 to 3 do not discuss about powdering resistance. "Powdering resistance" means a low occurrence of powdering (difficulty of peeling off the insulating coating) when an insulating coating is rubbed with a tension pad on a production line. Increasing carbon content in an insulating coating improves the punchability. Therefore, when an insulating coating contains organic resin, the punchability is improved. The presence of organic resin particulate in an insulating coating, however, deteriorates the powdering resistance. Consequently, it has been conventionally considered that an electrical steel sheet with an insulating coating, where the insulating coating contains organic resin, cannot achieve both improvement in punchability, and improvement in powdering resistance under a stricter condition simulating the line.

In view of the above problems, it could be helpful to provide an electrical steel sheet with an insulating coating that is excellent in both punchability and powdering resistance, without any chromium compound being contained in the insulating coating.

Solution to Problem

As a result of a keen study, we made the following discoveries. As described above, it has been considered that particulate organic resin in an insulating coating adversely affects the powdering resistance. However, we accidentally found that for an insulating coating containing Si and particulate organic resin, the powdering resistance can be improved by using organic resin that has a specific average primary particle size, and keeping the organic resin primary particles in the insulating coating in a specifically agglomerated state. That is to say, it is possible to achieve both punchability and powdering resistance by containing such specifically agglomerated organic resin in the insulating coating.

The disclosure is based on the aforementioned discoveries. We thus provide the following.

(1) An electrical steel sheet with an insulating coating including an electrical steel sheet and an insulating coating formed on the electrical steel sheet, where
the insulating coating contains Si and particulate organic resin, the organic resin contains primary particles having an average primary particle size of 1.0 μm or less, and 5% or more and 50% or less of the primary particles of the organic resin are agglomerated particles.

(2) The electrical steel sheet with an insulating coating according to (1), where the insulating coating contains Fe, and a ratio of the Fe content to the Si content, expressed as Fe/Si, is 0.01 to 0.6 in molar ratio.

(3) The electrical steel sheet with an insulating coating according to (2), where a ratio of a coating weight of organic component in the insulating coating in terms of C to a sum of a coating weight of the Fe in terms of $Fe_2O_3$ and a coating weight of the Si in terms of $SiO_2$ in the insulating coating, expressed as $C/(Fe_2O_3+SiO_2)$, is 0.05 or more and 0.8 or less.

(4) The electrical steel sheet with an insulating coating according to any one of (1) to (3), where organic wax concentrated on a surface of the insulating coating covers 1% or more and 5% or less of the surface of the insulating coating.

(5) The electrical steel sheet with an insulating coating according to any one of (1) to (4), where the Si coating weight in terms of $SiO_2$ is 50 mass % or more and 95 mass % or less of a total coating weight.

(6) The electrical steel sheet with an insulating coating according to any one of (1) to (5), where the organic resin has a glass transition point of 0° C. or higher and 100° C. or lower.

(7) The electrical steel sheet with an insulating coating according to any one of (1) to (6), where the insulating coating contains plate-like silica.

(8) The electrical steel sheet with an insulating coating according to (7), where the plate-like silica has an average particle size of 10 nm to 600 nm, and an aspect ratio of 2 to 400.

Advantageous Effect

The electrical steel sheet with an insulating coating of the disclosure is excellent in both punchability and powdering resistance, without any chromium compound being contained in the insulating coating.

DETAILED DESCRIPTION

The electrical steel sheet with an insulating coating (the insulating coating-formed electrical steel sheet) of the disclosure includes an electrical steel sheet, and an insulating coating formed on the electrical steel sheet.

(Electrical Steel Sheet)

The electrical steel sheet of the disclosure is not particularly restricted to any specific electrical steel sheet. An electrical steel sheet comprising a common chemical composition can be used. Examples of common components include Si and Al, and the balance consists of Fe and incidental impurities. Usually, the Si content is 0.05 mass % to 7.0 mass %, and the Al content is 2.0 mass % or less.

The type of the electrical steel sheet is not particularly restricted, either. An ordinary cold rolled steel sheet such as a soft iron sheet (electrical core sheet) with a high magnetic flux density or a SPCC, a non-oriented electrical steel sheet containing Si or Al for increasing specific resistance, or the like can be used. It is preferable to use a non-oriented electrical steel sheet according to JIS C2522:2000, or a grain-oriented electrical steel sheet according to JIS C2553: 2012.

(Insulating Coating)

The insulating coating of the disclosure contains Si and particulate organic resin, and Fe if necessary. Hereinafter, the components contained in the insulating coating will be described.

An insulating coating containing Si can be prepared by using Si compounds as raw material. Examples of Si compound include colloidal silica, fumed silica, plate-like silica, alkoxysilane and siloxane. The insulating coating of the disclosure contains Si by using one or more selected from these compounds. Colloidal silica, fumed silica and plate-like silica form particulates in the insulating coating. Organic Si compounds such as alkoxysilane and siloxane form a matrix in the insulating coating.

The Si compound used for preparing the insulating coating preferably has reactive functional groups. By using a Si compound having reactive functional groups, a firm insulating coating is formed, and the adhesion property and the punchability are greatly improved. The reactive functional group may be an addition reactive group, a condensation reactive group, a ring-opening reactive group, or a radical reactive group. Examples of reactive functional group include a silicon atom-bonding hydrogen atom, an alkenyl group (a vinyl group, an allyl group, a propenyl group or the like), a mercapto group-containing organic group, a silicon atom-bonding alkoxy group (a methoxy group, an ethoxy group, a propoxy group or the like), a silicon atom-bonding hydroxy group, a silicon atom-bonding halogen atom, an amino group-containing organic group (a 2-aminoethyl group, a 3-aminopropyl group), an epoxy group-containing organic group (a glycidoxyalkyl group (a 3-glycidoxypropyl group or the like), an epoxycyclohexylalkyl group (a 2-(3, 4-epoxycyclohexyl)ethyl group or the like) or the like), an acryl-containing organic group (a 3-acryloxypropyl group or the like), a methacryl-containing organic group (3-methacryloxypropyl group or the like).

From the perspective of further improving the effects of the disclosure, it is preferable to use a Si compound that has an epoxy group-containing organic group, a Si compound that has an amino group-containing organic group, or a Si compound that has a silicon atom-bonding alkoxy group among the Si compounds having reactive functional groups.

Furthermore, it is preferable to use a Si compound in which two or more types of reactive functional groups are bonded to one Si atom in the disclosure. Examples include a Si compound that has a silicon atom-bonding alkoxy group and an epoxy group-containing organic group, such as a 3-glycidoxypropyltrimethoxysilane, a 3-glycidoxypropylmethyldimethoxysilane or the like, and a Si compound that has a silicon atom-bonding alkoxy group and an amino group-containing organic group, such as a 3-aminopropyltrimethoxysilane, a N-2-(aminoethyl)-3-aminopropyltrimethoxysilane or the like.

Moreover, it is preferable to use two or more types of Si compounds having different types of reactive functional groups in the disclosure. Examples include a combination of Si compound that has an amino group-containing organic group and Si compound that has an epoxy group-containing organic group (e.g. a combination of 3-glycidoxypropyltrimethoxysilane and 3-aminopropyltrimethoxysilane, a combination of 3-glycidoxypropyltrimethoxysilane and N-2-(aminoethyl)-3-aminopropyltrimethoxysilane, or the like), a combination of Si compound that has a silicon atom-bonding alkoxy group and Si compound that has an epoxy group-containing organic group (e.g. a combination of 3-glycidoxypropyltrimethoxysilane and methyltriethoxysilane, a combination of 3-glycidoxypropylmethyldimethoxysilane and methyltriethoxysilane, or the like).

When using two or more types of the above-described Si compounds having different types of reactive functional groups, the use ratio of each Si compound is not particularly restricted, and may be set as appropriate. For example, in a case of using a combination of Si compound that has an amino group-containing organic group and Si compound that has an epoxy group-containing organic group, the mass ratio of the Si compounds used as raw materials (Si compound that has an epoxy group-containing organic group/Si compound that has an amino group-containing organic group) is preferably 0.25 to 4.0 from the perspective of improving corrosion resistance; and in a case of using a combination of Si compound that has a silicon atom-bonding alkoxy group and Si compound that has an epoxy group-containing organic group, the mass ratio of the Si compounds used as raw materials (Si compound that has an epoxy group-containing organic group/Si compound that has a silicon atom-bonding alkoxy group) is preferably 0.20 to 3.0 from the perspective of improving resistance to boiling steam.

Furthermore, it is preferable to use Si compounds having reactive functional groups in combination with one or more selected from colloidal silica, fumed silica, and plate-like silica in the disclosure. When using the combination, the ratio of the total mass of colloidal silica, fumed silica and plate-like silica to the total mass of Si compounds having reactive functional groups (colloidal silica+fumed silica+plate-like silica)/Si compounds) is preferably 2.0 or less from the perspective of improving scratch resistance.

The colloidal silica and the fumed silica preferably have an average particle size of 5 nm to 100 nm. The term "average particle size" herein is a particle size of which the cumulative frequency of the particle size distribution is 50% by volume percentage, the particle size distribution being measured by a laser diffraction type particle size distribution measuring device. Examples of colloidal silica include products of SNOWTEX® (SNOWTEX is a registered trademark in Japan, other countries, or both) C, N, 20, OS, OXS, OL manufactured by NISSAN CHEMICAL INDUSTRIES, LTD.; and examples of dry silica include products of AEROSIL® (AEROSIL is a registered trademark in Japan, other countries, or both) 50, 130, 200, 300, 380 manufactured by NIPPON AEROSIL CO., LTD. It is possible to use one or more of these products.

The plate-like silica is also referred to as leaf silica or scaly silica, having a layered silicate structure in which a number of thin layers of $SiO_2$ are stacked. Such plate-like silica is preferably amorphous or microcrystalline. The plate-like silica can be obtained by preparing agglomerated particles of stacked primary particles of the thin layers, and pulverizing these agglomerated particles. Such plate-like silica can inhibit permeation of corrosion substances because of the layered form; is more excellent in adhesion property because of the presence of many hydroxyl groups; and is excellent in slidability because of the flexibility as compared with common silica particles such as colloidal silica and the like. Therefore, the plate-like silica is effective for improving corrosion resistance and punchability.

The plate-like silica preferably has an average particle size of 10 nm to 600 nm and an aspect ratio of 2 to 400. The term "average particle size" of the plate-like silica is an average length of long diameters on a plane perpendicular to the thickness for all particles of the plate-like silica in a visual field observed under an SEM (Scanning Electron Microscope) at 20000 times magnification. The term "aspect ratio" of the plate-like silica is an average value of ratios of long diameter on a plane perpendicular to the thickness to maximum thickness for all particles of plate-like silica in a visual field observed by an SEM at 20000 times magnification.

Regarding the Si content in the insulating coating, the Si coating weight in terms of $SiO_2$ (hereinafter "Si coating weight") is preferably 50% mass or more and 95% mass or less of the total coating weight. When the Si coating weight is 50 mass % or more of the total coating weight, the adhesion property and the powdering resistance do not deteriorate. When the Si coating weight is 95% or less of the total coating weight, the adhesion property and the appearance do not deteriorate. The "coating weight" in the description is the mass of a dry coating. The "total coating weight" is the actual mass of a dried insulating coating indicated in $g/m^2$.

The insulating coating of the disclosure preferably contains Fe. An insulating coating containing Fe can be prepared by using Fe compounds (compounds that provide Fe ions or Fe colloids to a coating solution for forming an insulating coating) as raw material, or by eluting Fe from the electrical steel sheet when forming the insulating coating. Examples of Fe compound include iron acetate, iron citrate and ammonium iron citrate. Fe is present in the matrix in the insulating coating.

The elution amount of Fe can be adjusted by adjusting the steel component of the electrical steel sheet, the pH of the coating solution for forming the insulating coating, the leaving time after applying the coating solution to the electrical steel sheet until baking, and the like. Specifically, a high content of Al in the electrical steel sheet tends to reduce the elution amount of Fe; a high content of Si in the electrical steel sheet tends to increase the elution amount of Fe; a low PH of the coating solution tends to increase the elution amount of Fe; and a long leaving time after applying the coating solution to the electrical steel sheet until baking tends to increase the elution amount of Fe. The Fe content of the insulating coating can be adjusted in these ways.

Regarding the Fe content in the insulating coating, it is preferable that the ratio of the Fe content to the Si content, expressed as Fe/Si, in the insulating coating is 0.01 to 0.6 in molar ratio. It is generally considered that Fe eluting in an insulating coating tends to deteriorate the coating properties. However, we accidentally found that for an insulating coating containing Si as one of the main inorganic components, the adhesion property is improved by containing a specific amount of Fe in the insulating coating. The effect of improving adhesion property can be obtained when the Fe/Si is 0.01 or more. On the other hand, when the Fe/Si is 0.6 or less, the adhesion property and the punchability do not deteriorate. The Fe/Si is preferably in a range of 0.01 to 0.60, more preferably in a range of 0.02 to 0.5, and most preferably in a range of 0.02 to 0.50.

The Fe/Si of the disclosure can be measured by dissolving the insulating coating in a heated 20 mass % NaOH aqueous solution (hot alkali dissolution) and performing ICP analysis to the Fe and Si in the solution.

Increasing carbon content in the insulating coating improves punchability. Therefore, in the disclosure, the insulating coating contains organic resin to increase carbon content. That is to say, the scratch resistance and the punchability are improved by containing organic resin in the insulating coating. The organic resin used in the disclosure is not particularly restricted, and may be any known resin. Examples include an aqueous resin (emulsion, dispersion and water-soluble) such as acrylic resin, alkyd resin, polyolefin resin, styrene resin, polyvinyl acetate resin, epoxy resin, phenolic resin, polyester resin, urethane resin, melamine resin. It is preferably an emulsion of acrylic resin or ethylene acrylic acid resin. These organic resins have a melting point higher than the baking temperature of the insulating coating, which will be described later, and therefore will be present in the insulating coating as particulates rather than being melt.

As described above, it has been considered that such particulate organic resin in an insulating coating adversely affects the powdering resistance. However, in the disclosure, the powdering resistance can be improved by keeping the average primary particle size of the organic resin 1.0 µm or less, and keeping the ratio of primary particles that agglomerate to form secondary particles to all organic resin primary particles (hereinafter, "agglomerating ratio") 5% or more and 50% or less. The effect of improving punchability is certainly obtainable as long as the insulating coating contains organic resin. When the average primary particle size is more than 1.0 µm, or when the agglomerating ratio is less than 5% or more than 50%, the powdering resistance significantly deteriorates. It is more preferable that the average primary particle size is 0.1 µm or less, and the agglomerating ratio is 10% or more and 30% or less from the perspective of improving powdering resistance. Furthermore, since the smaller the average primary particle size is the better for improving the powdering resistance, the lowest limit of the average primary particle size is not particularly restricted. However, the average primary particle size is preferably 0.01 µm or more because an emulsion of organic resin can be stably produced in this situation.

We have considered the reasons why the powdering resistance is improved as follows. The reasons, however, do not restrict the disclosure by any means. First, reducing the average primary particle size helps to form a dense insulating coating. As a result, concentration of resin on the surface of the insulating coating is suppressed, and the amount of resin peeled off by a tension pad is reduced. Second, the agglomerating ratio means that, in order to improve powdering resistance, it is better to have a predetermined proportion of primary particles aggregated to form secondary particles than to keep all organic resin particles as primary particles. This is because when a predetermined proportion of primary particles aggregate to form secondary particles, pressure is preferentially applied to the aggregated parts, which narrows the area to be peeled by a tension pad on the insulating coating; on the other hand, when all organic resin particles are kept as primary particles, a wide area on the insulating coating will be peeled by a tension pad.

Furthermore, the smaller the average primary particle size is the better for improving punchability. While the specific reason is unclear, it is conceivable that during punching, a uniform dispersion of organic resin between a steel sheet and a press mold, where the organic resin works as a solid lubricant, helps to widen the contact area between the press mold and the resin, and accordingly increases the protection effectiveness of lubrication to the press mold. The finer the particle size is the better for improving powdering resistance and punchability.

The "average primary particle size of organic resin" in the disclosure is obtained by observing the surface of the insulating coating at 20000 times magnification under an SEM, and arithmetically averaging the particle size of all primary particles (including those agglomerating to form secondary particles) in a visual field for three visual fields. For primary particles having anisotropy, the maximum long diameter is defined as the particle size.

The "agglomerating ratio of organic resin" in the disclosure is obtained by observing the surface of the insulating coating at 20000 times magnification under an SEM, and arithmetically averaging the ratio of the number of primary particles agglomerating to form secondary particles to the number of all primary particles in a visual field for three visual fields.

The agglomerating ratio of organic resin can be adjusted by adjusting the stirring time when stirring a simple resin liquid (a dispersion liquid of resin before being mixed with other components such as Si compounds to prepare a coating solution) dispersed in a solvent of water at a low speed. The stirring speed is preferably 50 rpm to 150 rpm, and more preferably 80 rpm to 120 rpm. When the stirring speed is within the range, the longer the stirring time is the more the agglomerating ratio increases. In order to obtain an agglomerating ratio of 5% to 50%, the stirring time is preferably 0.1 hour to 4 hours, and more preferably 0.5 hour to 3 hours.

The organic resin used in the disclosure preferably has a glass transition point (Tg) of 0° C. or more and 100° C. or less. With a TG within the range, the resin component in the insulating coating softens more easily by the heat generated at the edge of the press mold during punching, and the lubrication effect is improved. The punchability is accordingly greatly improved. The TG is more preferably in a range of 0° C. or more and 50° C. or less.

The electrical steel sheet with an insulating coating of the disclosure may contain organic wax. Containing organic wax in the insulating coating improves the powdering resistance.

The organic wax used in the disclosure is not particularly restricted, as long as the organic wax has a melting point of 140° C. or less. For example, polyolefin wax (e.g. polyethylene wax), paraffin wax (e.g. synthetic paraffin, natural paraffin, or the like), fluororesin wax (e.g. polytetrafluoroethylene or the like) and the like can be used alone or in combination of two or more.

Such organic wax has a melting point lower than the baking temperature of the insulating coating, which will be described later, and accordingly is concentrated on the surface of the insulating coating. The concentrated parts of wax have irregular shapes, and are scattered on the surface of the insulating coating with low uniformity. Therefore, the concentrated parts of wax are clearly distinguishable from the particulate organic resin under an SEM observation. In the disclosure, the coverage of wax on the surface of the insulating coating is preferably 1% or more and 5% or less. When the coverage is 1% or more, the slidability of the coating surface is improved by the wax, which further improves the powdering resistance. When the coverage is 5% or less, a coil collapse caused by a low surface friction coefficient does not occur.

The "coverage of wax" is obtained by observing the surface of the insulating coating at 5000 times magnification under an SEM (accelerating voltage being 1 keV), and arithmetically averaging the area ratio of all concentrated parts of wax in a visual field for three visual fields.

The content of organic component in the insulating coating is not particularly restricted, yet the ratio of the coating weight of C in terms of organic component (hereinafter, "C coating weight") to the sum of the coating weight of Fe in terms of $Fe_2O_3$ (hereinafter, "Fe coating weight") and the coating weight of Si in terms of $SiO_2$ (hereinafter, "Si coating weight"), expressed as $C/(Fe_2O_3+SiO_2)$, is preferably 0.05 or more and 0.8 or less. The ratio being 0.05 or more greatly improves the punchability, and the ratio being 0.8 or less does not deteriorate the scratch resistance. Furthermore, the organic component includes not only organic resin, but organic Si compound, organic wax, and other organic compound if contained.

The "Si coating weight", "Fe coating weight" and "C coating weight" in the disclosure can be obtained by dissolving the insulation coating in a heated 20 mass % NaOH-water solution (hot alkali dissolution), ICP analyzing the Fe, Si and C in the solution, and calculating the value in terms of $g/m^2$.

In addition to the above-mentioned components, the insulating coating in the disclosure may also contain common additives such as an anticorrosive, a lubricant and an antioxidant, and other inorganic compounds and organic compounds. Examples of the organic compound include organic acid, which works as a contact inhibitor between inorganic component and organic resin. The organic acid may be a polymer or a copolymer containing acrylic acid, or the like. Examples of the inorganic compound include boric acid and pigment.

The contents of the above-mentioned additional components are not particularly restricted, as long as the components do not detract from the effects of the disclosure. For example, the ratio of the coating weight of the additional components to the sum of the Fe coating weight and the Si coating weight, expressed as (the additional components)/$(Fe_2O_3+SiO_2)$, is preferably less than 0.05.

The total coating weight of the insulating coating is not particularly restricted, and may be appropriately set based on the properties required for the insulating coating. Generally, it is preferably 0.05 $g/m^2$ to 20 $g/m^2$ per side, and more preferably 0.1 $g/m^2$ to 2 $g/m^2$ per side. The insulating coating is preferably formed on both sides of the electrical steel sheet. However, depending upon the application, the insulating coating of the disclosure may be formed on only one side of the electrical steel sheet, with or without other insulating coating being formed on the other side.

(Method of Manufacturing the Electrical Steel Sheet with an Insulating Coating)

Pretreatment for the electrical steel sheet is not particularly restricted. The electrical steel sheet may be untreated, yet it is advantageous to perform degreasing treatment such as alkali treatment, and pickling treatment with hydrochloric acid, sulfuric acid, phosphoric acid or the like.

Then, organic resin, which is to be contained in the insulating coating, is dispersed in water and the dispersion is stirred as described above. The agglomerating ratio of organic resin in the insulating coating is controlled in this way.

Then, a coating solution for forming the insulating coating is prepared. The coating solution is prepared by, for example, adding the Si compound, the organic resin, and if necessary, the Fe compound, the organic wax and the additional components, to deionized water, and mixing the solution. The agglomerating ratio of organic resin does not change greatly during treatment such as mixing the coating solution.

The pH of the coating solution may be adjusted when adjusting the coating solution. As described above, the pH of the coating solution is included in a set of the conditions which influence the Fe content in the insulating coating. The pH is preferably 3 or more and 12 or less in order to obtain a desired Fe content.

Then, the coating solution is applied to the surface of the electrical steel sheet, and the electrical steel sheet is left for a certain time. As described above, the leaving time is also included in a set of the conditions which influence the Fe content in the insulating coating. The leaving time is preferably 3 s to 220 s, and more preferably 10 s to 100 s in order to obtain a desired Fe content. During the leaving time, the atmosphere temperature can be a room temperature (for example, 10° C. to 30° C.).

The method of applying the coating solution to the surface of the electrical steel sheet is not particularly restricted. A most appropriate method, for example, a roll coating method, a bar coating method, a dip coating method, a spray coating method or the like, is selected according to the shape of the electromagnetic steel sheet to be treated.

Then, the coating solution applied to the electrical steel sheet is baked and formed into an insulating coating. The baking method is not particularly restricted, and a common method such as a hot blast heating method, an infrared heating method, an induction heating method or the like can be used. The peak metal temperature is not particularly restricted and can be in a range of about 150° C. to 350° C. The heating time is not particularly restricted, and can be appropriately set within a range of 1 s to 10 s.

The disclosure will be described in more detail using the examples below. However, the disclosure is not limited to these examples.

EXAMPLES

In the examples listed in Table 1, coating solutions were prepared by adding Si compound, organic resin, and in some examples organic wax, to deionized water. The coating solution pH is listed in table 1. The mass part in Table 1, which indicates the Si compound content, is an amount with respect to 100 mass parts of all effective components excluding water and solvent. The solid content concentration of all components with respect to the amount of deionized water was 50 g/L. The S1 to S9 in Table 1 correspond to the Si compounds listed in Table 2; the R1 to R6 in Table 1 correspond to the organic resins listed in Table 3, the Tg of each resin being listed in Table 1; the W1 and W2 correspond to the organic wax listed in Table 4. Prior to preparation of the coating solution, the organic resin dispersion was stirred at 100 rpm for the stirring time listed in Table 1.

In each example, a test piece with a width of 150 mm and a length of 300 mm was cut from an electrical steel sheet with a thickness of 0.35 mm [A360(JIS C2552(2000))], applied with the coating solution on one side by roll coater, left for the time listed in Table 1, and baked in a hot air baking furnace with a highest end-point temperature of 250° C. for a heating time of 30 s. After baking, the test piece was allowed to naturally cool at a normal temperature to obtain an insulating coating. The total coating weight was listed in Table 1.

For the insulating coating in each example, the Si coating weight, Fe coating weight and C coating weight (coating weight on one side, $g/m^2$) was obtained by the ICP measurement as described above. Table 1 lists the measured Si coating weight and Fe coating weight, and $C/(Fe_2O_3+SiO_2)$ and Fe/Si (moral ratio) calculated from the measurement results. The Si coating weight/the total coating weight is indicated as "$SiO_2$ content" in Table 1.

For the insulating coating in each example, the average primary particle size and agglomerating ratio of the organic resin, and the wax coverage were obtained by the above-mention method using an SEM. The results were listed in Table 1.

(Evaluation Method)

The punchability and powdering resistance of each obtained electrical steel sheet with an insulating coating was evaluated based on the following evaluation criteria. The results were listed in Table 1.

<Punchability>

The electrical steel sheets with an insulating coating were each subjected to punching using a 15 mmφ steel dice, repeated until the burr height reaches 50 μm, and the punchability was evaluated with the number of punchings (times).

(Criteria)

Excellent: 1200000 times or more

Good: 1000000 times or more and less than 1200000 times

Medial: 700000 times or more and less than 1000000 times

Poor: 300000 times or more and less than 700000 times

Very poor: less than 300000 times

<Powdering Resistance (XY Stage Method)>

A conventional powdering resistance test could not simulate an actual line situation, leading to the failure of obtaining a consistency between an actual powdering result and a lab test result. In this regard, the powdering resistance of the disclosure was evaluated using an XY stage method, which simulates a situation nearer to an actual one.

The test was conducted with a felt with a contact area of 15 mm×15 mm. The load was 0.087 MPa (0.89 kgf/cm$^2$). The surface of the insulating coating was rubbed with the felt. At the same time, the felt, which was attached to an XY plotter, was moved for 36 m without being lifted from the plotter, repeating the movements of 400 mm in the X-axis direction and 15 mm in the Y-axis direction. The moving speed was 150 mpm. The felt after the test was analyzed by X-ray fluorescence, and the coating weight of Si, which was the main component of the insulating film, to the felt was considered as the peeling amount of the coating. The powdering resistance was evaluated with the peeling amount of the coating.

(Criteria)

Excellent: peeling amount of coating being less than 0.1 g/m$^2$

Good: peeling amount of coating being 0.1 g/m$^2$ or more and less than 0.15 g/m$^2$ Poor: peeling amount of coating being 0.15 g/m$^2$ or more and less than 0.20 g/m$^2$ Very poor: peeling amount of coating being 0.20 g/m$^2$ or more As illustrated in Table 1, all of the electrical steel sheets with an insulating coating according to the disclosure are excellent in both punchability and powdering resistance.

TABLE 1

| | | Insulating coating Inorganic component | | | | | | | | | | | |
|---|---|---|---|---|---|---|---|---|---|---|---|---|---|
| | | Si compound | | | | | | | | | Si | Fe | |
| No. | Classification | S1 Mass part | S2 Mass part | S3 Mass part | S4 Mass part | S5 Mass part | S6 Mass part | S7 Mass part | S8 Mass part | S9 Mass part | coating weight g/m$^2$ | coating weight g/m$^2$ | Fe/Si |
| 1 | Example | 50 | — | 50 | — | — | — | — | — | — | 0.3 | 0.004 | 0.010 |
| 2 | Example | 50 | — | 50 | — | — | — | — | — | — | 0.3 | 0.019 | 0.048 |
| 3 | Example | 50 | — | 50 | — | — | — | — | — | — | 0.3 | 0.039 | 0.097 |
| 4 | Example | 50 | — | 50 | — | — | — | — | — | — | 0.3 | 0.126 | 0.314 |
| 5 | Example | 50 | — | 50 | — | — | — | — | — | — | 0.3 | 0.204 | 0.509 |
| 6 | Example | 50 | — | 50 | — | — | — | — | — | — | 0.3 | 0.239 | 0.598 |
| 7 | Example | 50 | — | — | 50 | — | — | — | — | — | 0.3 | 0.041 | 0.103 |
| 8 | Example | — | 50 | — | — | 50 | — | — | — | — | 0.3 | 0.039 | 0.097 |
| 9 | Example | 50 | — | — | — | — | 50 | — | — | — | 0.3 | 0.048 | 0.121 |
| 10 | Example | 50 | — | — | — | — | — | 50 | — | — | 0.3 | 0.034 | 0.086 |
| 11 | Example | — | — | — | — | 50 | — | 50 | — | — | 0.3 | 0.038 | 0.095 |
| 12 | Example | 60 | — | — | — | 30 | 10 | — | — | — | 0.3 | 0.021 | 0.053 |
| 13 | Example | 30 | — | 30 | — | 20 | 20 | — | — | — | 0.3 | 0.025 | 0.062 |
| 14 | Example | 20 | — | 20 | — | 20 | 20 | 20 | — | — | 0.3 | 0.023 | 0.058 |
| 15 | Example | 50 | — | — | — | — | — | — | 50 | — | 0.3 | 0.048 | 0.121 |
| 16 | Example | 50 | — | — | — | — | — | — | — | 50 | 0.3 | 0.039 | 0.098 |
| 17 | Example | 50 | — | — | — | — | — | — | 25 | 25 | 0.3 | 0.034 | 0.085 |
| 18 | Example | 30 | — | 30 | — | — | — | — | 20 | 20 | 0.3 | 0.042 | 0.105 |
| 19 | Example | 50 | — | 50 | — | — | — | — | — | — | 0.3 | 0.066 | 0.164 |
| 20 | Example | 50 | — | 50 | — | — | — | — | — | — | 0.3 | 0.033 | 0.082 |
| 21 | Example | 50 | — | 50 | — | — | — | — | — | — | 0.3 | 0.053 | 0.132 |
| 22 | Example | 50 | — | 50 | — | — | — | — | — | — | 0.3 | 0.052 | 0.131 |
| 23 | Example | 50 | — | 50 | — | — | — | — | — | — | 0.3 | 0.050 | 0.124 |
| 24 | Example | 50 | — | 50 | — | — | — | — | — | — | 0.3 | 0.054 | 0.136 |
| 25 | Example | 50 | — | 50 | — | — | — | — | — | — | 0.3 | 0.046 | 0.116 |
| 26 | Example | 50 | — | 50 | — | — | — | — | — | — | 0.3 | 0.058 | 0.145 |
| 27 | Example | 50 | — | 50 | — | — | — | — | — | — | 0.3 | 0.067 | 0.168 |
| 28 | Example | 50 | — | 50 | — | — | — | — | — | — | 0.3 | 0.053 | 0.132 |
| 29 | Example | 50 | — | 50 | — | — | — | — | — | — | 0.3 | 0.045 | 0.113 |
| 30 | Comparative example | 50 | — | 50 | — | — | — | — | — | — | 0.3 | 0.070 | 0.176 |
| 31 | Comparative example | 50 | — | 50 | — | — | — | — | — | — | 0.3 | 0.061 | 0.152 |
| 32 | Comparative example | 50 | — | 50 | — | — | — | — | — | — | 0.3 | 0.061 | 0.153 |
| 33 | Comparative example | 50 | — | 50 | — | — | — | — | — | — | 0.3 | 0.055 | 0.138 |

TABLE 1-continued

| No. | | | | | | | | | | | | |
|---|---|---|---|---|---|---|---|---|---|---|---|---|
| 34 | Comparative example | 50 | — | 50 | — | — | — | — | — | — | 0.3 | 0.050 | 0.125 |
| 35 | Comparative example | 50 | — | 50 | — | — | — | — | — | — | 0.3 | 0.054 | 0.134 |

| | Insulating coating | | | | | | | | | | |
|---|---|---|---|---|---|---|---|---|---|---|---|
| | Organic resin | | | | Wax | | Total | | | Leaving | Coating property |
| No. | Type | Average primary particle size μm | Agglomerating ratio % | Stirring time hr | Tg ° C. | Type | Coverage % | coating weight of organic component C/(Si + Fe) | Total coating weight g/m² | SiO₂ content mass % | Coating solution pH | time after applying until baking second | Powdering resistance | Punchability |
| 1 | R1 | 0.10 | 20.0 | 1.0 | 12 | — | — | 0.1 | 0.33 | 89.7 | 5.9 | 7 | Excellent | Excellent |
| 2 | R1 | 0.10 | 20.0 | 1.0 | 12 | — | — | 0.1 | 0.35 | 85.4 | 6.3 | 12 | Excellent | Excellent |
| 3 | R1 | 0.10 | 20.0 | 1.0 | 12 | — | — | 0.1 | 0.37 | 80.5 | 5.6 | 15 | Excellent | Excellent |
| 4 | R1 | 0.10 | 20.0 | 1.0 | 12 | — | — | 0.1 | 0.47 | 64.1 | 5.9 | 20 | Excellent | Excellent |
| 5 | R1 | 0.10 | 20.0 | 1.0 | 12 | — | — | 0.1 | 0.55 | 54.2 | 6.3 | 30 | Good | Excellent |
| 6 | R1 | 0.10 | 20.0 | 1.0 | 12 | — | — | 0.1 | 0.59 | 50.6 | 5.7 | 40 | Excellent | Excellent |
| 7 | R1 | 0.10 | 20.0 | 1.0 | 12 | — | — | 0.1 | 0.38 | 79.9 | 4.5 | 15 | Excellent | Excellent |
| 8 | R1 | 0.10 | 20.0 | 1.0 | 12 | — | — | 0.1 | 0.37 | 80.5 | 5.1 | 15 | Excellent | Excellent |
| 9 | R1 | 0.10 | 20.0 | 1.0 | 12 | — | — | 0.1 | 0.38 | 78.3 | 6.8 | 15 | Excellent | Excellent |
| 10 | R1 | 0.10 | 20.0 | 1.0 | 12 | — | — | 0.1 | 0.37 | 81.6 | 5.2 | 15 | Excellent | Excellent |
| 11 | R1 | 0.10 | 20.0 | 1.0 | 12 | — | — | 0.1 | 0.37 | 80.7 | 5.3 | 15 | Excellent | Excellent |
| 12 | R1 | 0.10 | 20.0 | 1.0 | 12 | — | — | 0.1 | 0.35 | 84.9 | 6.1 | 15 | Excellent | Excellent |
| 13 | R1 | 0.10 | 20.0 | 1.0 | 12 | — | — | 0.1 | 0.36 | 84.0 | 5.9 | 15 | Excellent | Excellent |
| 14 | R1 | 0.10 | 20.0 | 1.0 | 12 | — | — | 0.1 | 0.36 | 84.4 | 6.4 | 15 | Excellent | Excellent |
| 15 | R1 | 0.10 | 20.0 | 1.0 | 12 | — | — | 0.1 | 0.38 | 78.3 | 5.6 | 15 | Excellent | Excellent |
| 16 | R1 | 0.10 | 20.0 | 1.0 | 12 | — | — | 0.1 | 0.37 | 80.4 | 5.8 | 15 | Excellent | Excellent |
| 17 | R1 | 0.10 | 20.0 | 1.0 | 12 | — | — | 0.1 | 0.37 | 81.7 | 6.3 | 15 | Excellent | Excellent |
| 18 | R1 | 0.10 | 20.0 | 1.0 | 12 | — | — | 0.1 | 0.38 | 79.7 | 6.0 | 15 | Excellent | Excellent |
| 19 | R1 | 0.10 | 20.0 | 1.0 | 12 | — | — | 0.05 | 0.38 | 78.1 | 5.9 | 15 | Excellent | Good |
| 20 | R1 | 0.10 | 20.0 | 1.0 | 12 | — | — | 0.8 | 0.60 | 50.1 | 6.1 | 15 | Good | Excellent |
| 21 | R2 | 0.30 | 30.0 | 1.5 | 0 | — | — | 0.1 | 0.39 | 77.3 | 5.8 | 15 | Excellent | Excellent |
| 22 | R3 | 0.04 | 10.0 | 0.5 | 21 | — | — | 0.1 | 0.39 | 77.4 | 6.1 | 15 | Excellent | Excellent |
| 23 | R3 | 0.04 | 50.0 | 3.0 | 21 | — | — | 0.1 | 0.38 | 78.0 | 5.8 | 15 | Excellent | Excellent |
| 24 | R3 | 0.04 | 5.0 | 0.1 | 21 | — | — | 0.1 | 0.39 | 77.0 | 6.3 | 15 | Excellent | Excellent |
| 25 | R4 | 0.02 | 10.0 | 0.5 | −45 | — | — | 0.1 | 0.38 | 78.7 | 5.9 | 15 | Good | Good |
| 26 | R1 | 0.10 | 20.0 | 1.0 | 12 | W1 | 1.00 | 0.1 | 0.39 | 76.2 | 5.8 | 15 | Excellent | Excellent |
| 27 | R1 | 0.10 | 20.0 | 1.0 | 12 | W1 | 5.00 | 0.1 | 0.40 | 74.3 | 6.1 | 15 | Excellent | Excellent |
| 28 | R1 | 0.10 | 20.0 | 1.0 | 12 | W2 | 1.00 | 0.1 | 0.39 | 77.3 | 5.9 | 15 | Excellent | Excellent |
| 29 | R1 | 0.10 | 20.0 | 1.0 | 12 | W2 | 5.00 | 0.1 | 0.38 | 79.0 | 5.8 | 15 | Excellent | Excellent |
| 30 | R5 | 1.20 | 20.0 | 1.0 | 25 | — | — | 0.1 | 0.41 | 73.6 | 6.3 | 15 | Very poor | Good |
| 31 | R6 | 1.70 | 20.0 | 1.0 | −10 | — | — | 0.1 | 0.40 | 75.6 | 5.8 | 15 | Very poor | Good |
| 32 | R3 | 0.04 | 60.0 | 4.0 | 21 | — | — | 0.1 | 0.40 | 75.5 | 6.2 | 15 | Very poor | Good |
| 33 | R3 | 0.04 | 0.0 | 0.0 | 21 | — | — | 0.1 | 0.39 | 76.8 | 5.9 | 15 | Very poor | Good |
| 34 | R3 | 0.04 | 4.0 | 0.3 | 21 | — | — | 0.1 | 0.39 | 77.9 | 5.9 | 15 | Very poor | Good |
| 35 | R3 | 0.04 | 52.0 | 3.5 | 21 | — | — | 0.1 | 0.39 | 77.1 | 5.8 | 15 | Very poor | Good |

TABLE 2

| No. | Si Compound | Classification | Product name |
|---|---|---|---|
| S1 | 3-glycidoxypropyltrimethoxysilane | alkoxysilane | KBM-403 |
| S2 | 3-glycidoxypropylmethyldimethoxysilane | alkoxysilane | KBM-402 |
| S3 | 3-aminopropyltrimethoxysilane | alkoxysilane | KBM-903 |
| S4 | N-2-(aminoethyl)-3-aminopropyltrimethoxysilane | alkoxysilane | KBM-603 |
| S5 | Methyltriethoxysilane | alkoxysilane | KBE-13 |
| S6 | Colloidal silica | silica | SNOWTEX ®0 |
| S7 | Fumed silica | silica | AEROSIL ®200 |
| S8 | Plate-like silica (average particle size 0.2 μm, aspect ratio 30) | silica | — |
| S9 | Plate-like silica (average particle size 0.5 μm, aspect ratio 100) | silica | — |

TABLE 3

| No. | Organic Resin | Manufacturer | Product name |
|---|---|---|---|
| R1 | Acryl styrene emulsion resin | DIC | VONCOAT (CG8370) |
| R2 | Acryl emulsion resin | DIC | VONCOAT (SFC55) |
| R3 | Styrene acrylic emulsion resin | SEIKO PMC | X-436 |
| R4 | Urethane emulsion resin | SANYO CHEMICAL INDUSTRIES | UCOAT (UWS-145) |
| R5 | Vinyl acetate emulsion resin | DIC | VONCOAT (6620EF) |
| R6 | Acrylic emulsion resin | DIC | VONCOAT (VF1040) |

TABLE 4

| No. | Organic Wax | Manufacturer | Product name | Melting point |
|---|---|---|---|---|
| W1 | Polyethylene wax | MITSUI CHEMICALS | HI-WAX ®* 400P | 127° C. |

TABLE 4-continued

| No. | Organic Wax | Manufacturer | Product name | Melting point |
|---|---|---|---|---|
| W2 | Paraffin wax | NIPPON SEIRO | Hi-Mic-1080 | 83° C. |

*HI-WAX is a registered trademark in Japan, other countries, or both

INDUSTRIAL APPLICABILITY

The electrical steel sheet with an insulating coating of the disclosure is excellent in both punchability and powdering resistance, without any chromium compound being contained in the insulating coating, and is extremely useful as a part of a motor, a transformer or the like.

The invention claimed is:

1. An electrical steel sheet with an insulating coating comprising an electrical steel sheet and an insulating coating formed on the electrical steel sheet, wherein the insulating coating contains Si, Fe, and particulate organic resin, the organic resin contains primary particles having an average primary particle size of 1.0 μm or less, 5% or more and 50% or less of the primary particles of the organic resin are agglomerated particles, a ratio of the Fe content to the Si content, expressed as Fe/Si, is 0.01 to 0.6 in molar ratio, a ratio of a dry coating weight of organic component in the insulating coating in terms of C to a sum of a dry coating weight of the Fe in terms of $Fe_2O_3$ and a dry coating weight of the Si in terms of $SiO_2$ in the insulating coating, expressed as $C/(Fe_2O_3 + SiO_2)$, is 0.05 or more and 0.8 or less, and the dry coating weight of Si in terms of $SiO_2$ is 50 mass % or more and 95 mass % or less of a total dry coating weight.

2. The electrical steel sheet with an insulating coating according to claim 1, wherein organic wax concentrated on a surface of the insulating coating covers 1% or more and 5% or less of the surface of the insulating coating.

3. The electrical steel sheet with an insulating coating according to claim 1, wherein the organic resin has a glass transition point of 0° C. or higher and 100° C. or lower.

4. The electrical steel sheet with an insulating coating according to claim 1, wherein the insulating coating contains plate-like silica.

5. The electrical steel sheet with an insulating coating according to claim 4, wherein the plate-like silica has an average particle size of 10 nm to 600 nm, and an aspect ratio of 2 to 400.

* * * * *

UNITED STATES PATENT AND TRADEMARK OFFICE
CERTIFICATE OF CORRECTION

PATENT NO. : 10,526,672 B2
APPLICATION NO. : 15/562994
DATED : January 7, 2020
INVENTOR(S) : Naoki Muramatsu et al.

Page 1 of 1

It is certified that error appears in the above-identified patent and that said Letters Patent is hereby corrected as shown below:

On the Title Page

On page 2, (56) FOREIGN PATENT DOCUMENTS Line 12:
"TW 1221861B" should read "TW I221861B"

Signed and Sealed this
Third Day of March, 2020

Andrei Iancu
*Director of the United States Patent and Trademark Office*